Dec. 8, 1931.  A. F. KUNBERGER  1,835,954
GAS SCRUBBER
Filed Sept. 3, 1929  2 Sheets-Sheet 2
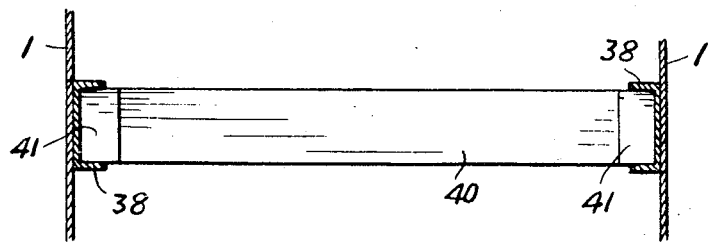
FIG.3.
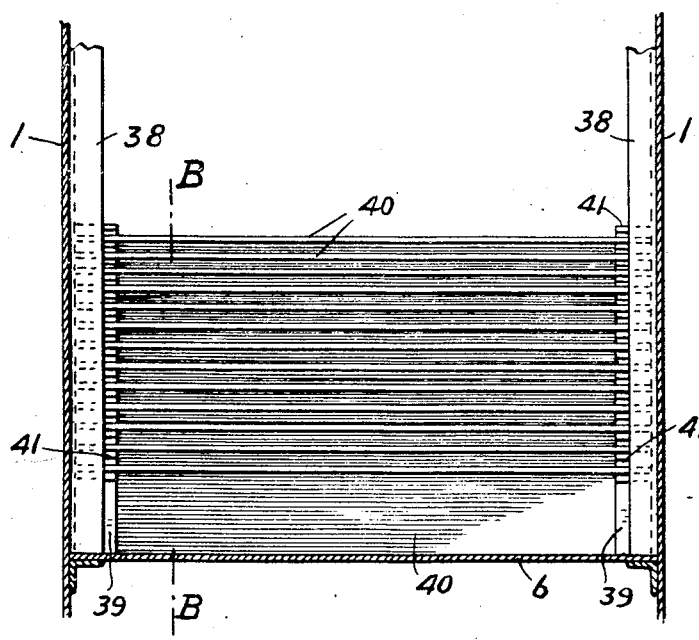 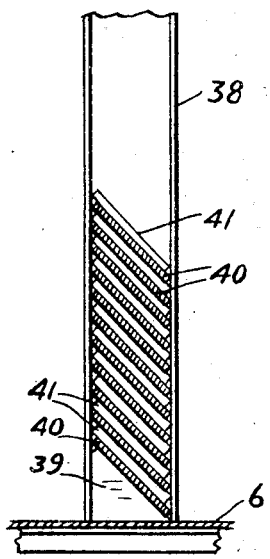
FIG.2.  FIG.4.
WITNESS:
INVENTOR
Albert F. Kunberger
BY
Augustus B. Stoughton
ATTORNEY.

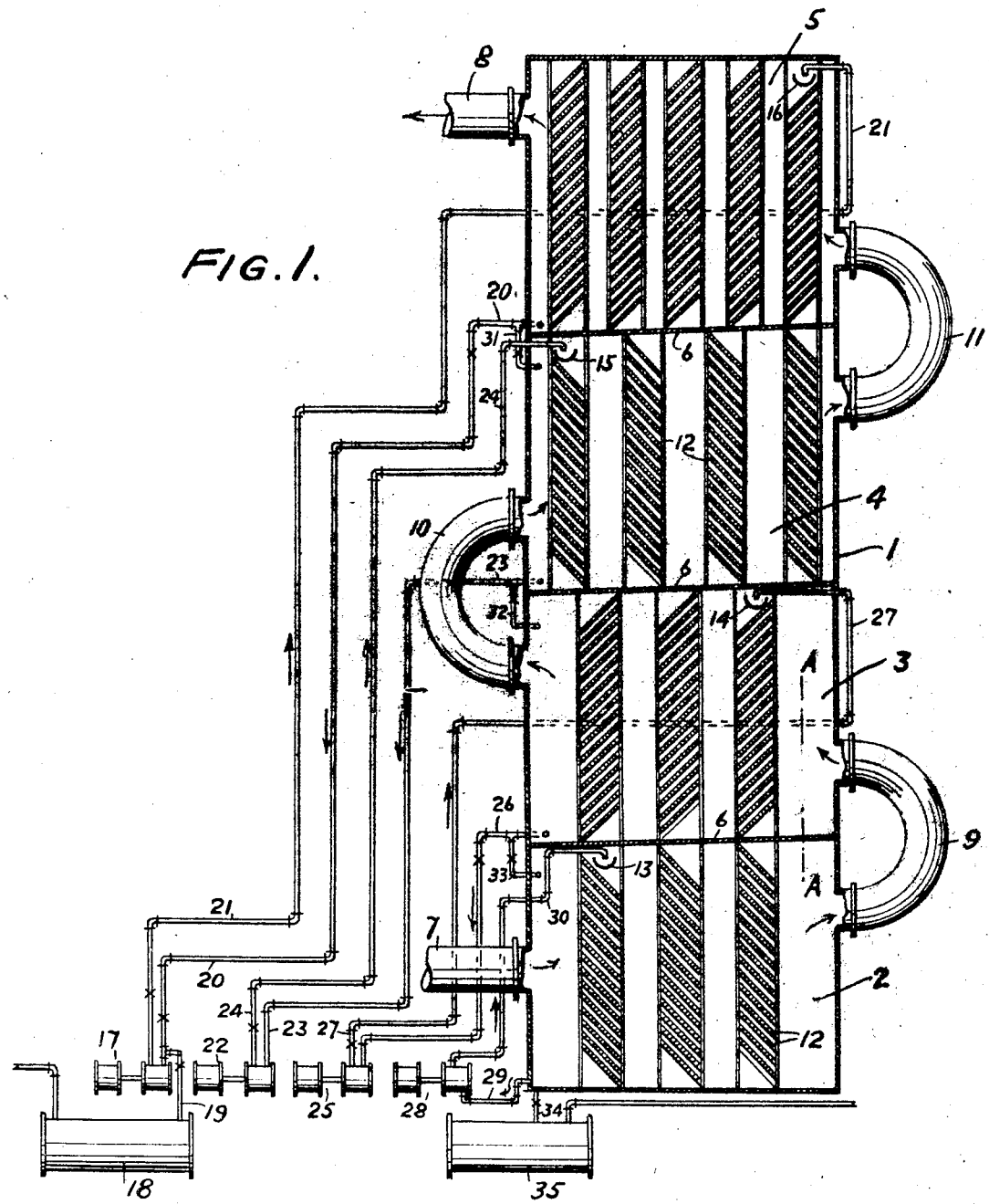

Patented Dec. 8, 1931

1,835,954

UNITED STATES PATENT OFFICE

ALBERT F. KUNBERGER, OF SWARTHMORE, PENNSYLVANIA, ASSIGNOR TO THE UNITED GAS IMPROVEMENT COMPANY, OF PHILADELPHIA, PENNSYLVANIA, A CORPORATION OF PENNSYLVANIA

GAS SCRUBBER

Application filed September 3, 1929. Serial No. 390,022.

The present invention relates to apparatus for effecting contact between gases and liquids.

There are many processes in the various industries in which gas is scrubbed with a liquid scrubbing medium to remove impurities from the gas to recover valuable products from the gas. As examples may be mentioned scrubbing manufactured combustible gas with oil for the removal and recovery of naphthalene and scrubbing such gas with iron sulphate and sodium carbonate for the removal and recovery of cyanogen.

In such operations, it is desirable to remove as completely as possible the selected constituents from the gas, with the use and loss of as small an amount of scrubbing medium as possible. This is especially the case where the scrubbing medium is costly and where the absorbed or otherwise removed constituents are valuable.

The principal object of the present invention is to provide an improved apparatus for such scrubbing of gas in the use of which the scrubbing operation is carried on effectively and in which there are provisions for minimizing the amount of scrubbing liquid carried away from the apparatus.

A further object of the invention is the provision of apparatus in which the gas is progressively scrubbed with fresher scrubbing medium in successive stages and in which provision is made for minimizing the transfer of scrubbing medium by the gas from one stage to another.

Other objects will appear in connection with the description of the attached drawings which form a part of this specification and in which, Figure 1 shows a partial elevation and partial vertical cross section of a form of the apparatus of the invention.

Figure 2 shows a vertical cross section of a portion of Figure 1 along line AA showing means for supporting the baffles.

Figure 3 is a plan view of Figure 2.

Figure 4 is a vertical cross section along the line B—B in Figure 2.

Referring to Figure 1—

1 generally indicates the shell of the apparatus which provides a chamber divided into compartments 2, 3, 4 and 5, by the partitions 6.

The lower compartment 2 is provided with the gas inlet 7. The upper compartment 5 is provided with the gas outlet 8 from the apparatus. Connection 9 between compartments 2 and 3, connection 10, between compartments 3 and 4 and connection 11 between compartments 4 and 5, serve as means for gas communication through the apparatus.

Within the compartments and preferably arranged in tiers, are the baffles 12. The baffles are arranged to provide comparatively narrow spaces between them for passage of gas.

Above the tier of baffles on the side of the compartment at which the gas enters, are provided distributing means for the liquid to be contacted with the gas, which may be termed a scrubbing medium.

In the drawings the distributing means are illustrated as the troughs 13, 14, 15 and 16, to which the scrubbing medium is supplied by means of pumps and the necessary piping, and, overflowing the troughs, drips down over the baffles.

The pump 17 is connected on its suction side with the fresh scrubbing medium tank 18, through the connection 19 and also with the compartment 5 near its base by connection 20. The pressure side of pump 17 discharges through connection 21 into trough 16.

Pump 22 is connected on its suction side through connection 23 with compartment 4 near its base, and its pressure side discharges through connection 24 into trough 15.

Pump 25 is connected on its suction side through connection 26 with compartment 3 near its base, and its pressure side discharges through connection 27 into trough 14.

Pump 28 is connected on its suction side through connection 29 with the base of compartment 2 and its pressure side discharges through connection 30 to trough 13.

The valved connection 31 provides means for discharging scrubbing medium from compartment 5 to compartment 4, valved connection 32, from compartment 4 to compartment 3, valved connection 33, from compartment 3 to compartment 2, and valved connection 34 provides a discharge from compartment 2 to the used scrubbing medium tank 35.

In operation, the gas enters the apparatus at gas inlet 7 and flows across compartments 2, 3, 4 and 5 successively to the gas outlet 8. The scrubbing medium is circulated in each compartment by the pump connected thereto from the base of the compartment to the trough, where it overflows and drips down over the baffles wetting the baffles and contacting with the gas, falling to the base of the compartment for recirculation.

In the type of baffle illustrated in the drawings the scrubbing medium flows over the top baffle and down the side edges of the baffles beneath it. The type of baffle illustrated is, however, merely an example. If desired, a baffle may be employed in which each alternate baffle plate is sloped in the opposite direction so that when the scrubbing medium flows from the top baffle it wets a large part of the upper surfaces of each of the baffles beneath.

The fresh scrubbing medium is admitted to compartment 5 and the used scrubbing medium is removed from the apparatus from compartment 2.

When the scrubbing medium in compartment 2 has absorbed the desired amount of constituents which are being removed from the gas, it is drained off into the tank 35, through connection 34. The scrubbing medium in compartment 3 is then transferred to compartment 2 through connection 33, the scrubbing medium in compartment 4 is transferred through connection 32 to compartment 3, and that in compartment 5 is transferred to compartment 4 through connection 31. Fresh scrubbing medium is then drawn from tank 18 and pumped into compartment 5, and the circulation of the scrubbing medium in the compartments resumed.

The untreated gas entering at 7 is treated first with the most used scrubbing medium and then progressively with fresher liquid until it leaves the apparatus through the offtake 8.

If desired, some fresh liquid may be continually admitted to compartment 5 with the recirculated liquid and some used liquid continually removed from compartment 2, at the same time providing a continuous flow from compartments 5 to 4, from 4 to 3, and from 3 to 2.

In the passage of the gas through each compartment, it first encounters the tier of baffles over which the scrubbing medium is distributed and then passes through the other tiers of baffles, which deflect the gas downward, the change in direction of the gas flow, the contact with the baffles and the assistance of gravitation, throw out of the gas scrubbing medium which has been entrained in the gas flow, preventing the transfer of scrubbing medium by the gas from one compartment to another.

The baffles are arranged so as to prevent the gas from flowing directly from the compartment gas inlet to the compartment gas outlet.

In the last compartment 5 it is preferable to provide additional baffles to insure the more complete removal of scrubbing medium before the gas leaves the apparatus.

The general horizontal flow of gas across the compartments, with the provision of scrubbing baffles and scrubbing medium distribution on the entrance side and the downward deflection of the gas by the scrubbing medium removal baffles placed beyond the scrubbing baffles on the gas flow, provide means for effectively removing the scrubbing medium from the gas, permitting efficient scrubbing with the use of the minimum amount of scrubbing medium and a minimum loss of scrubbing medium from the apparatus.

The particular means shown for distributing the scrubbing medium may be considerably modified, for instance, the troughs may be replaced by pipes having holes in their walls for the exit of the liquid, or the scrubbing medium might be sprayed into the space between the gas inlet and the first tier of baffles.

The number of compartments may be varied as is desirable depending on the particular contact process employed.

Referring to Figures 2, 3 and 4—

These figures show simple means for arranging and supporting the baffles within the apparatus.

1 indicates the shell of the apparatus, 6 a partition between compartments, and 38 are channels.

The blocks 39 of triangular cross section are laid in the bases of the channels as shown, and a baffle 40 is laid on the sloping faces of the blocks 39, with its ends within the sides of the channels 38, spacers 41 are laid on the baffle, and extending between the sides of the channels, another baffle laid on the spacers and succeeding spacers and baffles are built up in the same manner.

The slope of the faces of the blocks 39 determine the slope of the baffles. The sides of the channels hold the baffles in place, and they may be readily removed and replaced.

I claim:

1. A gas scrubber comprising a plurality of superposed shells, an inlet for gas to each shell, an outlet for gas from each shell, pipes external to said shells for connecting certain of said outlets with the inlets of superimposed shells, a plurality of sets of baffles arranged in said shells in the paths of the gas from said inlets to said outlets, said pipes being arranged so that the inflowing gas is introduced at right angles to said baffles, means for introducing a scrubbing medium to the tops of the sets of baffles nearest said inlets, and means for removing said scrubbing medium from the bottoms of said shells.

2. A gas scrubber comprising a plurality of superposed shells, an inlet for gas to each shell, an outlet for gas from each shell, pipes external to said shells for connecting certain of said outlets with the inlets of superimposed shells, a plurality of sets of baffles arranged in said shells in the paths of the gas from said inlets to said outlets, said pipes being arranged so that the inflowing gas is introduced at right angles to said baffles, means for introducing a scrubbing medium to the tops of the sets of baffles nearest said inlets, pipes external to said shells for removing said scrubbing medium from the bottoms of said shells and conducting it to the tops of the cells beneath, and a pump for each shell for circulating said scrubbing medium therethrough.

3. A gas scrubber comprising a plurality of superposed shells, an inlet for gas to each shell, an outlet for gas from each shell, pipes external to said shells for connecting certain of said outlets with the inlets of superimposed shells, a plurality of sets of baffles arranged in said shells in the paths of the gas from said inlets to said outlets, said pipes being arranged so that the inflowing gas is introduced at right angles to said baffles, means for introducing a scrubbing medium to the tops of the sets of baffles nearest said inlets, means for removing said scrubbing medium from the bottoms of said shells, a pipe connection between the bottom of each shell and the top of the shell beneath, and a valve in each of said connections.

4. A gas scrubber comprising a plurality of superposed shells, an inlet for gas to each shell, an outlet for gas from each shell, each shell enclosing a chamber including opposite walls, pairs of walls projecting from said opposite walls and forming channels, members having sloping upper edges placed in said channels, a baffle member having ends placed on said sloping members and received in said channels, and spacers placed upon said baffle member; and baffle members and spacers alternately superposed thereon.

ALBERT F. KUNBERGER.